UNITED STATES PATENT OFFICE.

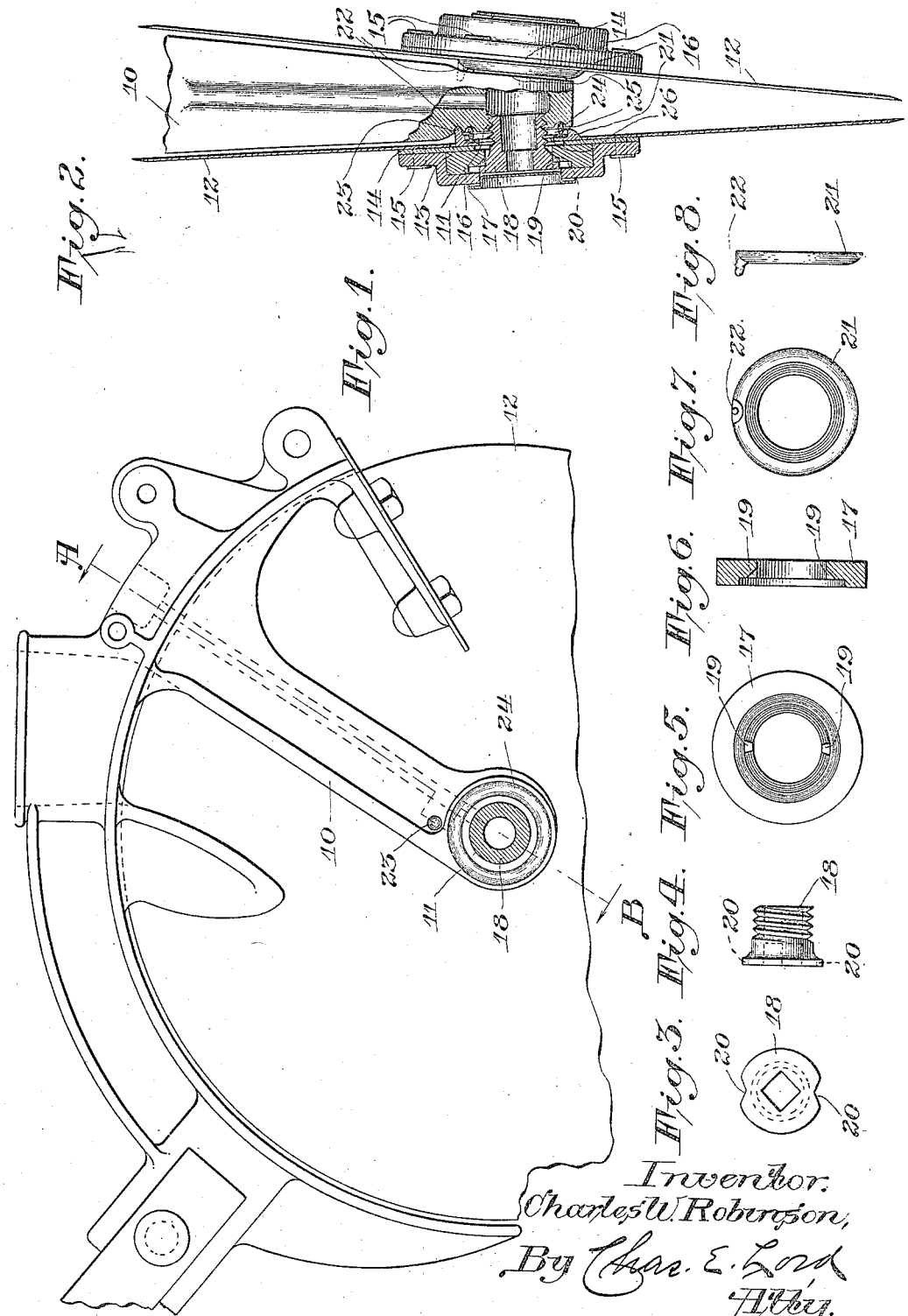

CHARLES W. ROBINSON, OF HAMILTON, ONTARIO, CANADA, ASSIGNOR TO INTERNATIONAL HARVESTER COMPANY OF CANADA, LIMITED, A CORPORATION OF ONTARIO.

DISK-BEARING FOR GRAIN-DRILLS.

1,306,776.  Specification of Letters Patent.  Patented June 17, 1919.

Application filed December 24, 1917. Serial No. 208,681.

*To all whom it may concern:*

Be it known that I, CHARLES W. ROBINSON, a citizen of the United States, residing at Hamilton, in the county of Wentworth and Province of Ontario, Dominion of Canada, have invented certain new and useful Improvements in Disk-Bearings for Grain-Drills, of which the following is a full, clear, and exact specification.

My invention relates to bearings, and more particularly to bearings utilized in connection with furrow opening disks, such as those used on grain drills and machines of like character.

My invention is illustrated in connection with the double disk grain drill, and from the angular mounting of these disks it will be seen that the lateral pressure of the earth against the faces of the disks as the furrow is being opened causes an excessive wear on the bearings, and also unequal wear on different portions of the bearings.

My invention has for its object, to improve the construction of the bearings of this character and to develop a bearing that will be durable and lasting and, moreover, will be inexpensive to manufacture.

I attain this object by employing detachable bearing plates which can be easily and quickly renewed, and can be made in such a form as to resist wear and greatly outlast the construction now employed.

In the drawings I have illustrated one embodiment of my invention, in which—

Figure 1 shows a side elevation, partly broken away, of a double disk grain drill;

Fig. 2 is a view partly in section taken substantially on the line A—B of Fig. 1;

Figs. 3 and 4 illustrate in detail the construction of a securing bolt employed with my improved bearing;

Figs. 5 and 6 are plan and sectional views of a reversible bearing plate; and

Figs. 7 and 8 are plan and side elevations respectively of another bearing plate utilized in this construction.

In the usual construction of bearing for grain drills the furrow opening disk is utilized as one of the bearing members, and when the bearing portion of this disk has become worn it is necessary to entirely replace the disk. With my improved construction, however, I have employed furrow opening disks having an enlarged central opening, and having secured thereto a steel wearing plate. This wearing plate constitutes the central bearing member, and on each side of this plate is mounted a bearing member, formed preferably of cast iron chilled on the surface.

This construction will now be described in detail, and referring to the drawings, the grain drill has the usual central casting 10, provided at its lower end with right and left hand threaded apertures, the left hand aperture being shown in Fig. 2 at 11. The furrow opening disks 12 are provided with enlarged central openings 13, and have secured thereto at their inner circumferential portions steel bearing plates 14. These bearing plates are secured to the disks by bolts or screws 15, which are also utilized to secure to the bearing plates and disks, housing members 16. These housings inclose reversible bearing members 17, which are adjustably secured in place by bolts 18 threaded into the central casting 10. These bearing members 17 are provided at diametrically opposite points on their inner peripheries with outwardly extending projections 19, which register with diametrically opposed notches 20 formed in the periphery of the securing bolts 18. On the inner side of the bearing plates 14 I have mounted bearing members 21, preferably formed of cast iron and chilled on their inner flat bearing surfaces, and these bearing members take up the wear on the inner side of the plates 14. The bearing members 21 are provided on the outer peripheral portions with outwardly projecting lugs 22, which extend into suitable cavities or indentations 23 in the central casting 10, and in this manner the members 21 are prevented from turning. The central casting is also provided with a circumferential groove 24, in which is seated a spring 25 which presses the bearing plates 21 in contact with the central bearing member 14. If desired, a felt washer 26 may be inserted between the inner end of the spring and the bearing plate 21 to prevent dust and dirt from gaining access to the interior of the bearing.

In the operation of a double disk grain drill or furrow opener, such as illustrated in the drawing, the forward movement of the drill causes a lateral inward pressure against the forward half of the disk and an outward pressure against the rearward portion, and because of this pressure the bearing member 17 becomes worn on its outer surface at the front end and on its inner surface at the rear portion, and after the member 17 has become worn to such a degree as to affect the efficient operation of the machine, the bolt 20 may be loosened and the member 17 may be diametrically reversed, thereby providing two comparatively new and unworn bearing portions. When the wear on the central bearing plate 14, or the inner bearing member 21, has become sufficient to cause the machine to operate inefficiently, these plates can be readily removed and new plates substituted therefor, and the operator can in this way obtain a construction substantially as good as an entirely new machine, and without the necessity of replacing the furrow opening disks or any of the other parts of the device.

While I have, in the above description, set forth one embodiment which my invention may assume, it will be understood that the invention is capable of many modifications, and that such modifications may be employed without departing from the spirit of my invention, as expressed in the following claims.

What I claim as new is:

1. In a grain drill, a frame member, a rotatable member, a reversible bearing member carried by said frame member and engaging said rotatable member, and means for preventing relative rotation between said bearing member and frame member in all positions of the adjustment of said bearing member.

2. In a grain drill, a frame member, a rotatable member, a reversible bearing member carried by said frame member and engaging said rotatable member, means for securing said bearing member to said frame member, and means on said securing means and said bearing member for preventing relative rotation between said bearing member and said frame member in all positions of adjustment of said bearing member.

3. In a grain drill, a furrow opening disk, a bearing plate secured to said disk, a bearing member mounted on one side of said disk, and a second bearing member mounted on the opposite side of said disk, one of said bearing members being adjustable with respect to said bearing plate.

4. In a grain drill, a frame, a rotatable member, a bearing plate, a housing secured to said rotatable member and bearing plate, a bearing member inclosed in said housing and contacting with one face of said bearing plate, a second bearing member carried by said frame and contacting with the opposite side of said bearing plate, means for adjusting said first mentioned bearing member with relation to said bearing plate, and resilient means for holding said second named bearing member in contact with said bearing plate.

5. In a grain drill, a central casting having outwardly extending oppositely disposed apertures, a rotatable member positioned at each side of said casting, a bearing member carried by said casting at each side thereof, each bearing member contacting with one face of one of said rotatable members, and means for independently adjusting said bearing members.

6. In a grain drill, a central casting having outwardly extending oppositely disposed apertures, a rotatable member positioned at each side of said casting, a bearing member carried by said casting at each side thereof, each of said bearing members contacting with one face of one of said rotatable members, and screw threaded adjusting means for independently adjusting said bearing members.

7. In a grain drill, a central casting having outwardly extending oppositely disposed apertures, a rotatable member positioned at each side of said casting, a bearing member carried by said casting at each side thereof, each of said bearing members contacting with one face of one of said rotatable members, and screw threaded means having central apertures therethrough for independently adjusting said bearing members.

8. In combination, a rotatable member, a bearing plate, a housing secured to said bearing plate and rotatable member, a bearing member inclosed in said housing and contacting with one face of said bearing plate, said bearing member having diametrically disposed lugs, a frame member and means for securing said bearing member to said frame member, said last named means having diametrically disposed notches registering with the lugs on said bearing member.

9. In a grain drill, a frame member, a rotatable member, a bearing plate secured to said rotatable member, and a bearing member disposed between said frame member and said bearing plate and having an outwardly projecting lug, said frame member having an indentation registering with said lug whereby relative rotation between said bearing member and said frame member is prevented.

In testimony whereof I affix my signature.

CHARLES W. ROBINSON.

Copies of this patent may be obtained for five cents each, by addressing the "Commissioner of Patents, Washington, D. C."